US012292033B2

(12) United States Patent
Gosain et al.

(10) Patent No.: US 12,292,033 B2
(45) Date of Patent: May 6, 2025

(54) WIND TURBINE AND METHOD FOR MANUFACTURING A WIND TURBINE

(71) Applicant: Siemens Gamesa Renewable Energy A/S, Brande (DK)

(72) Inventors: Vikram Gosain, Haryana (IN); Matthias Lenssen, Hamburg (DE); Adam Lord, Hamburg (DE); Nehru Maniraj, Tamilnadu (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 146 days.

(21) Appl. No.: 18/109,000

(22) Filed: Feb. 13, 2023

(65) Prior Publication Data
US 2023/0265836 A1  Aug. 24, 2023

(30) Foreign Application Priority Data
Feb. 24, 2022 (EP) ...................................... 22158586

(51) Int. Cl.
*F03D 80/80* (2016.01)
(52) U.S. Cl.
CPC .................... *F03D 80/85* (2016.05)
(58) Field of Classification Search
CPC .......... F03D 80/00; F03D 80/85; F03D 80/50; F03D 13/20; F03D 13/201; F03D 13/122
See application file for complete search history.

(56) References Cited

U.S. PATENT DOCUMENTS

| 8,669,474 B2 * | 3/2014 | Battle ................... H01B 9/027 |
| | | 174/117 R |
| 9,051,920 B2 * | 6/2015 | Prebio ..................... F03D 80/00 |
| 2012/0006578 A1 | 1/2012 | Schubert |
| 2016/0311641 A1 * | 10/2016 | Langel ................... B65H 75/08 |
| 2017/0097110 A1 * | 4/2017 | Hamsho ................. F03D 80/85 |

FOREIGN PATENT DOCUMENTS

| DE | 102016219048 A1 | 1/2018 |
| EP | 2495439 A1 | 9/2012 |
| EP | 3702616 A1 * | 9/2020 ............. F03D 13/40 |

OTHER PUBLICATIONS

European Search Report issued on Aug. 5, 2022 for application No. 22158586.2.

* cited by examiner

*Primary Examiner* — David E Sosnowski
*Assistant Examiner* — Maxime M Adjagbe
(74) *Attorney, Agent, or Firm* — Schmeiser, Olsen & Watts LLP

(57) ABSTRACT

A wind turbine includes a tower, a nacelle supported rotatably at a top portion of the tower, a main cable for transporting electrical energy produced in the nacelle to a bottom portion of the tower, and at least one auxiliary cable guided from the nacelle to an intermediate portion between the top and bottom portion and/or to the bottom portion of the tower, wherein the main cable includes a first loop, and the at least one auxiliary cable includes a second loop, and the first and second loops are configured for compensating, independently from each other, a movement of the respective cable due to rotation of the nacelle relative to the tower. Thus, movement of the auxiliary cables caused by yawing of the nacelle will not affect movement of the main cable.

15 Claims, 7 Drawing Sheets

WIND TURBINE AND METHOD FOR MANUFACTURING A WIND TURBINE

CROSS-REFERENCE TO RELATED APPLICATIONS

This application claims priority to EP Application Serial No. 22158586.2, having a filing date of Feb. 24, 2022, the entire contents of which are hereby incorporated by reference.

FIELD OF TECHNOLOGY

The following relates to a wind turbine and a method for manufacturing a wind turbine.

BACKGROUND

A wind turbine comprises a generator for converting rotational energy of a rotor into electrical energy. The generator is usually arranged in a nacelle atop a large tower. The electrical energy produced in the nacelle is transported by means of one or more heavy cables from the nacelle to a bottom portion of the tower. Further, auxiliary cables are guided in addition from the nacelle to an intermediate portion or the bottom portion of the tower. These auxiliary cables may include, for example, electrical cables, data cables etc. for connecting devices in the nacelle.

In most modern wind turbines, the nacelle is supported rotatably by a top portion of the tower via a yaw bearing to allow yawing of the nacelle with respect to the static tower. In this manner, the rotor orientation of the wind turbine can be adjusted to a current wind direction. Such an azimuth rotation of the nacelle can encompass as much as two and a half full turns (2.5 times 360 degrees) of the nacelle relative to the tower.

Installation of the main cable transporting the energy produced in the rotating nacelle to the bottom portion of the static tower and of any auxiliary cables guided from the nacelle to an intermediate portion or bottom portion of the tower need to take the yawing movement of the nacelle relative to the tower into account.

SUMMARY

An aspect relates to provide an improved wind turbine and an improved method for manufacturing a wind turbine.

Accordingly, a wind turbine is provided. The wind turbine comprises a tower, a nacelle supported rotatably at a top portion of the tower, a main cable for transporting electrical energy produced in the nacelle to a bottom portion of the tower, and at least one auxiliary cable guided from the nacelle to an intermediate portion between the top and bottom portion and/or to the bottom portion of the tower. Furthermore, the main cable comprises a first loop, and the at least one auxiliary cable comprises a second loop, and the first and second loops are configured for compensating, independently from each other, a movement of the respective cable due to rotation of the nacelle relative to the tower.

Rotation of the nacelle relative to the tower causes a movement of the main cable and the at least one auxiliary cables, as the attachment points of theses cables in or at the nacelle move with respect to the static tower. Such a movement includes twisting as well as vertical movement of the respective cables. As the main cable and the at least one auxiliary cable each comprises a loop within the tower, compensation of a movement of the respective cable due to rotation of the nacelle relative to the tower is possible.

Further, the first and second loops are installed decoupled from each other such that they can compensate said movement independently from each other. Thus, a movement including twisting, bending and/or vertical movement of the at least one auxiliary cable will not affect a movement including twisting, bending and/or vertical movement of the main cable and vice versa. A twisting movement is, in particular, a rotational movement around an axis being arranged parallel to a longitudinal direction of the respective cable and/or to a tower height in the erected state of the tower. A vertical movement is, in particular a translational movement in a direction parallel to the tower height.

The twisting capacity, e.g., the allowable twisting per meter, of a cable depends on its diameter (thickness) and on the cable construction. Further, the bending capacity, i.e., the allowable minimum bending radius, of a cable also depends on its diameter (thickness) and on the cable construction. The main cable usually has a larger diameter and is less flexible compared to the at least one auxiliary cable. Therefore, the main cable has a smaller allowable twisting per meter and a larger minimum bending radius compared to the at least one auxiliary cable. Hence, the main cable requires a larger bending radius of a U-shaped portion (or S-shaped or helical shaped portion) of its first loop compared to the at least one auxiliary cable. Furthermore, the main cable requires a larger free-hanging length of its first loop to compensate for twisting movement over a larger length compared to the at least one auxiliary cable. Thus, as the first and second loops are decoupled from each other, the second loop can be configured with a smaller bending radius of its U-shaped portion (or S-shaped or helical shaped portion) and with a shorter free-hanging length compared to the first loop.

The wind turbine is an apparatus to convert the wind's kinetic energy into electrical energy. The wind turbine comprises, for example, a rotor having one or more blades connected each to a hub, the nacelle including a generator, and the tower holding, at its top end, the nacelle. The tower of the wind turbine may be connected to a foundation of the wind turbine such as a monopile or a concrete foundation in the seabed or the ground.

The wind turbine comprises, for example, a yaw bearing for rotatably supporting the nacelle at the top portion of the tower. The first and second loops are configured for compensating a yawing movement of the nacelle relative to the tower.

The main cable is, in particular, a power cable. The main cable is, for example, a high voltage cable for transferring an electrical current with a voltage above 10 kV, above 30 kV and/or above 50 kV (e.g., in the range of 32 kV to 72 kV and/or of 66 kV).

The main cable is usually a very heavy cable. A weight of the main cable is, for example, 10 kg per meter or more, 14 kg per meter or more, 17 kg per meter or more and/or 20 kg per meter or more.

The main cable is, for example, installed in one piece and one go in the tower after erecting the tower. Alternatively, the main cable may, for example, also be installed in parts in the tower. For example, a first portion of the main cable may be installed in a lower part of the tower, the lower part comprising, for example, a bottom and a first middle tower section. Further, a second portion of the main cable may be installed, for example, in an upper part of the tower, the upper part comprising, for example, a second middle tower section and a top tower section.

An upper end of the main cable is, for example, electrically connected to a generator unit or a transformer unit arranged in the nacelle. A lower end of the main cable is, for example, electrically connected to a switch gear in the bottom portion (e.g., on a switch gear platform) of the tower.

The at least one auxiliary cable includes, for example, one or more electrical cables, one or more fiber optics cable and/or one or more earth cables. The at least one auxiliary cable includes, for example, at least one low voltage cable for transferring an electrical current with a voltage below 1 kV and/or in the range of 12 to 690 V.

The at least one auxiliary cable is, for example, configured for serving one or more electrical and/or electronical devices in the nacelle. The at least one auxiliary cable is, for example, configured for supplying power to the one or more electrical/electronical devices, for electrical grounding of the one or more electrical/electronical devices, and/or for transferring data to or from the one or more electrical/electronical devices.

An upper end of the at least one auxiliary cable is, for example, electrically connected to an interface unit arranged in the nacelle and/or the one or more electrical/electronical devices arranged in the nacelle. A lower end of the at least one auxiliary cable is, for example, electrically connected in the intermediate portion or the bottom portion of the tower.

The first and second loops are, in particular, arranged inside the tower.

The main cable comprises a first portion forming the first loop and a second portion being continuous with the first portion. Hence, the main cable including its first loop is a one-piece element. Further, the first portion of the main cable forming the first loop is configured to move in response of yawing of the nacelle. The second portion of the main cable is arranged—with respect to a direction along the main cable from the nacelle to the bottom portion of the tower—behind the first portion and is not affected by a movement due to the yawing of the nacelle.

Similar as for the main cable, the at least one auxiliary cable comprises a first portion forming the second loop and a second portion being continuous with the first portion. Hence, the at least one auxiliary cable including its second loop is a one-piece element. Further, the first portion of the at least one auxiliary cable forming the second loop is configured to move in response of yawing of the nacelle. The second portion of the at least one auxiliary cable is arranged—with respect to a direction along the at least one auxiliary cable from the nacelle to the intermediate/bottom portion of the tower—behind the first portion and is not affected by a movement due to the yawing of the nacelle.

According to an embodiment, each of the first and second loops comprises, in a direction along the respective cable, an upper attachment point at the nacelle, an intermediate attachment point in the tower for stopping a twisting movement of the respective cable and a lower attachment point in the tower for stopping a twisting and vertical movement of the respective cable, and each of the first and second loops comprises a free-hanging portion between its upper and intermediate attachment points, and/or a U-shaped portion between its intermediate and lower attachment points.

The first and/or second loops each comprises, for example, a free-hanging portion and a U-shaped portion. The free-hanging portion and the U-shaped portion are, in particular, continuous with each other. The U-shaped portion is, for example, arranged, with respect to the direction along the respective cable from the nacelle to the intermediate/bottom portion of the tower, behind the free-hanging portion. The free-hanging portion is, for example, configured for compensating a twisting and/or vertical movement of the respective cable due to rotation of the nacelle. The U-shaped portion is, for example, configured for compensating a vertical movement of the respective cable due to rotation of the nacelle. The U-shaped portion may, for example, not be configured for compensating a twisting movement of the respective cable due to rotation of the nacelle.

A transition between the free-hanging portion and the U-shaped portion of each of the main cable and the at least one auxiliary cable is, for example, defined by an attachment element (e.g., a slider unit) stopping a twisting movement but allowing movement (e.g., sliding) in a vertical direction of the tower. The main cable and the at least one auxiliary cable comprise, for example, separate attachment elements for stopping a twisting movement but allowing movement in a vertical direction of the tower. Having these separate attachment elements allows to decouple the first and second loops from each other.

The attachment element configured for stopping a twisting movement but allowing a movement in a vertical direction may include a slider unit with a slider element sliding in the vertical direction with respect to a slider housing. Alternatively, the attachment element configured for stopping a twisting movement but allowing a movement in a vertical direction may include an arrangement in which the respective cable is fixed at a rotating element, the rotating element being able to rotate around an axis arranged perpendicular to the height direction of the erected tower.

The upper attachment point "at the nacelle" includes, for example, an upper attachment point in the nacelle (e.g., in the case of the main cable) and/or an upper attachment point at a bottom portion of the nacelle (e.g., in the case of the at least one auxiliary cable).

In embodiments, instead of a U-shaped portion, one or both of the first and second loops may also comprise an S-shaped portion or a helically formed portion between its intermediate and lower attachment points.

According to a further embodiment, each of the first and second loops comprises a U-shaped portion, and the U-shaped portion of the first loop is arranged, with respect to a tower height, at a lower height than the U-shaped portion of the second loop.

In embodiments, one or both of the first and second loops may also comprise—instead of an U-shaped portion—an S-shaped portion or a helically shaped portion between its intermediate and lower attachment points, and the S-shaped portion/helically shaped portion of the first loop is arranged, with respect to a tower height, at a lower height than the S-shaped portion/helically shaped portion of the second loop.

According to a further embodiment, each of the first and second loops comprises a free-hanging portion, and a cable length of the free-hanging portion of the first loop is larger than a cable length of the free-hanging portion of the second loop.

The free-hanging portion of the respective loop is a portion of the respective cable that can twist in order to compensate yawing of the nacelle.

Having a larger free-hanging portion of the first loop of the main cable is of advantage for a main cable having a smaller allowable twisting per meter compared to the at least one auxiliary cable.

According to a further embodiment, each of the first and second loops comprises an attachment point at the nacelle and one or more further attachment points in the tower, and the one or more further attachment points of the first loop is/are arranged, with respect to a tower height, at a lower height than the one or more further attachment points of the second loop.

In particular, the first loop is formed by a first cable portion of the main cable, and the second loop is formed by a first cable portion of the at least one auxiliary cable. Further, an upper end of each first cable portion is attached at the nacelle at the respective attachment point, and a lower end of each first cable portion is attached in the tower at the respective further attachment point.

According to a further embodiment, the wind turbine comprises
- a first attachment arrangement for forming the first loop in the tower, and/or for attaching the first loop at its intermediate and lower attachment points, and
- a second attachment arrangement for forming the second loop in the tower, and/or for attaching the second loop at its intermediate and lower attachment points,
- wherein the first attachment arrangement is arranged, with respect to a tower height, at a lower height than the second attachment arrangement.

Since the first and second attachment arrangements are separate devices, a movement of the first and second loops can be better decoupled from each other.

According to a further embodiment, the wind turbine comprises at least two platforms arranged, with respect to a tower height in the erected state of the tower, at different heights inside the tower, wherein
- a U-shaped portion of the first loop is arranged at a lower one of the at least two platforms and a U-shaped portion of the second loop is arranged at a higher one of the at least two platforms, and/or
- the first attachment arrangement is arranged at a lower one of the at least two platforms and the second attachment arrangement is arranged at a higher one of the at least two platforms.

In particular, tower platforms which are anyway present in the tower for other purposes, such as a tower section platform, a lift platform or a damper platform can be used to arrange the respective U-shaped portion and/or the respective attachment arrangement.

The tower comprises, for example, a lift platform where an upper end of a tower lift is arranged. Further, the upper one of the at least two platforms is, for example, the lift platform.

The tower comprises, for example, at least a topmost and a further tower section bolted to each other at respective flanges. Further, the lower one of the at least two platforms is, for example, configured for bolting the tower sections to each other (a so-called tower section platform or bolting platform).

However, the upper and/or lower platform may also be any other platform of the tower.

According to a further embodiment,
- the first and second attachment arrangements comprise a first and second slider unit, respectively, for attaching the respective loop at its intermediate attachment point and/or for stopping a twisting movement of the respective cable,
- each of the first and second slider units comprises a slider housing attached inside the tower and a slider element for sliding in the respective slider housing,
- the main cable is attached to the slider element of the first slider unit for providing intermediate attachment point of the first loop, and
- the at least one auxiliary cable is attached to the slider element of the second slider unit for providing the intermediate attachment point of the second loop.

The slider housing of each of the first and second slider units is, for example, attached to a (e.g., separate) tower platform.

The first slider unit is, in particular, arranged, with respect to the tower height, at a lower height (e.g., a lower platform) than the second slider unit.

According to a further embodiment, the first attachment arrangement comprises a carrying structure with a cable tray for attaching and carrying the main cable and/or for providing the lower attachment point of the first loop.

For example, in a direction along the main cable from the nacelle to the bottom portion of the tower, the main cable enters the tower, passes the sliding unit and then the carrying structure. Further, the first loop of the main cable comprises a U-shaped portion between the corresponding sliding unit and the cable tray of the carrying structure.

According to a further embodiment, the carrying structure is arranged pivotably on a platform of the tower such that it can be folded towards the platform for transportation and folded up for operation of the wind turbine.

Therefore, the carrying structure of the first attachment arrangement can be configured such that a worker can walk underneath and at the same time is not an obstacle when transporting a tower section comprising the respective platform. Hence, the carrying structure can be arranged on a platform that also serves other purposes such as a bolting platform. The carrying structure is, for example, folded up during assembly of the tower and before operation of the wind turbine.

According to a further embodiment,
- the tower comprises one or more separator disks for separating the main cable and the at least one auxiliary cable from each other in a region of a free-hanging portion of the first and second loops in which the main cable and the at least one auxiliary cable run in parallel,
- the one or more separator disks each have a ring-shaped structure comprising a middle hole with a first radius for inserting the main cable and at least one further opening extending from the middle hole radially outwards to a second radius with an interior wall arranged at the second radius, and
- the at least one auxiliary cable is attached to the interior wall of the at least one further opening such that the at least one separator disk follows a motion of the at least one auxiliary cable.

By separating the main cable and the at least one auxiliary cable from each other, an interference of the main cable and the at least one auxiliary cable is avoided. Thus, a motion of the main cable and the at least one auxiliary cable can be better separated from each other.

The separator disks are, in particular, configured for separating the main cable and the at least one auxiliary cable from each other with respect to a horizontal distance. The horizontal distance is a distance with respect to a horizontal direction of the erected tower.

According to a further embodiment, each of the one or more separator disks comprises two or more of the further openings evenly spaced with respect to angular distances across the ring-shaped structure, and/or the at least one further opening is tapered in a radial direction from the second radius to the first radius.

Thus, in each of the two or more further openings, one or more of the at least one auxiliary cable can be attached. Having the further openings arranged evenly across the separator disk provides a uniform distribution of forces acting from the auxiliary cables to the separator disk.

By the at least one further opening being tapered in the radial direction from the second radius to the first radius, the at least one auxiliary cable can be better separated from the main cables.

According to a further embodiment, the wind turbine comprises, arranged in the nacelle, a generator unit for converting rotational energy into electrical energy and a transformer unit for transforming the electrical energy from a low voltage state to a high voltage, wherein the main cable is electrically connected at an upper end thereof to the transformer unit for transporting the electrical energy in the high voltage state towards the bottom portion of the tower.

Since the transformer unit is arranged in the nacelle—and not, for example, in a bottom portion of the tower—the main cable is configured for transporting the electrical energy in the high voltage state towards the bottom portion of the tower. As a high voltage cable is usually very thick and has a small allowable twisting per meter, decoupling of the movement of the main cable from the at least one auxiliary cable is of particular advantage in this case.

According to a further aspect, a method for manufacturing a wind turbine is provided. The wind turbine comprises a tower, a nacelle supported rotatably at a top portion of the tower, a main cable for transporting electrical energy produced in the nacelle to a bottom portion of the tower, and at least one auxiliary cable guided from the nacelle to an intermediate portion between the top and bottom portion and/or the bottom portion of the tower. Further, the main cable comprises a first loop and the at least one auxiliary cable comprises a second loop. The method comprises the steps:

installing the at least one auxiliary cable with the second loop in the tower,
erecting the tower, and
installing the main cable with the first loop in the tower, wherein the first and second loops are configured to compensate, independently from each other, a movement of the respective cable due to rotation of the nacelle relative to the tower during operation of the wind turbine.

Thus, the at least one auxiliary cable including its second loop can be installed in the tower before erecting the tower and before installing the main cable. The at least one auxiliary cable including its second loop may, for example, be installed in the tower at a manufacturing site and/or manufacturing hall remote from the erection site/wind harvesting site of the wind turbine.

Installing the at least one auxiliary cable with the second loop in the tower includes, for example, installing the second attachment arrangement in the tower (e.g., at a tower platform) and attaching the least one auxiliary cable at the attachment arrangement such that the second loop is formed. For example, it includes attaching the least one auxiliary cable to a slider unit and/or a cable tray of a carrying structure of the attachment arrangement.

The at least one auxiliary cable with the second loop may also be installed in a tower section of the tower. In this case, erecting the tower may include assembling the tower from two or more tower sections.

According to an embodiment of the further aspect, the wind turbine comprises at least two platforms arranged at different heights inside the tower, installing the main cable with the first loop in the tower includes forming the first loop by means of a first attachment arrangement arranged on a lower one of the at least two platforms, and installing the at least one auxiliary cable with the second loop in the tower includes forming the second loop by means of a second attachment arrangement arranged at a higher one of the at least two platforms.

The embodiments and features described with reference to the wind turbine of embodiments of the present invention apply mutatis mutandis to the method of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
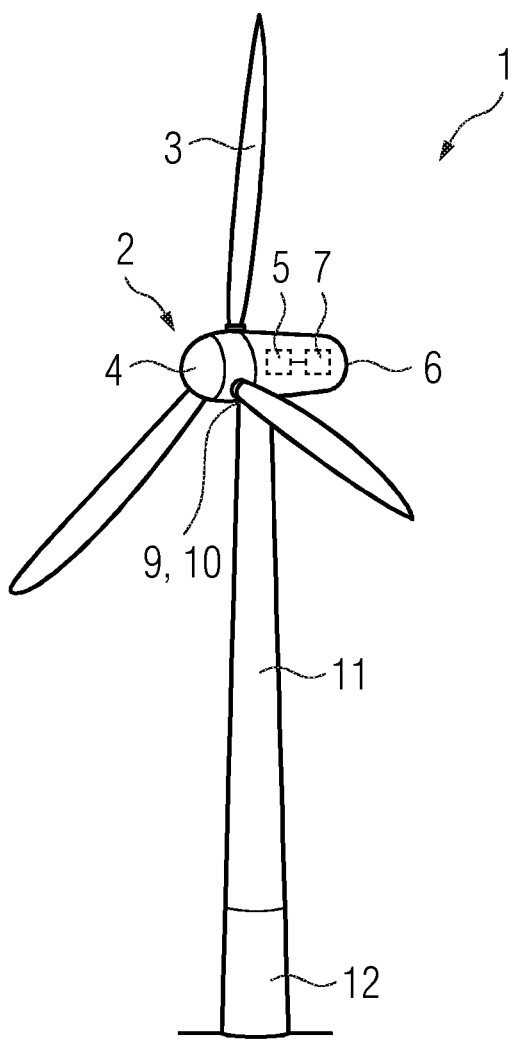
FIG. 1 shows a wind turbine according to an embodiment.

In the Figures, like reference numerals designate like or functionally equivalent elements, unless otherwise indicated.

FIG. 1 shows a wind turbine 1 according to an embodiment. The wind turbine 1 comprises a rotor 2 having one or more blades 3 connected to a hub 4. The hub 4 is connected to a generator unit 5 arranged inside a nacelle 6. During operation of the wind turbine 1, the blades 3 are driven by wind to rotate and the wind's kinetic energy is converted into electrical energy by the generator unit 5. The wind turbine 1 may further comprise a transformer unit 7 connected to the generator unit 5 and arranged in the nacelle 6. The transformer unit 7 is configured for transforming the electrical energy produced by the generator unit 5 from a low voltage state (e.g., below 1 kV) to a high-voltage state (e.g., above 10 kV and/or above 30 kV).

The nacelle 6 is arranged via a yaw bearing 8 (FIG. 2) at a top portion 9 (i.e., upper end 10) of a tower 11 of the wind turbine 1. The tower 11 is erected on a foundation 12 such as a concrete foundation or a monopile driven into the ground or seabed.

Figure 2:
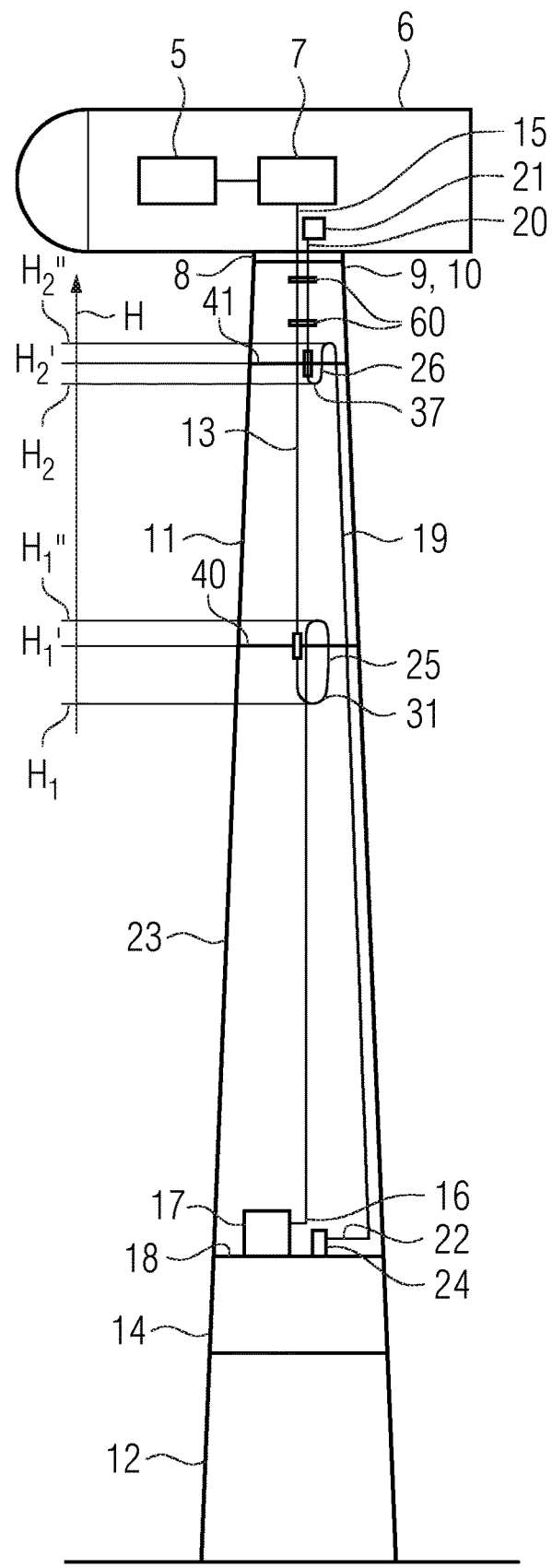
FIG. 2 shows a tower of the wind turbine from FIG. 1 including a main cable and an auxiliary cable.

FIG. 2 shows a partial enlarged view of the tower 11 and the nacelle 6 of the wind turbine 1 of FIG. 1.

The nacelle 6 is supported rotatably by means of the yaw bearing 8 at the top portion 10 of the tower 11. Thus, the nacelle 6 is capable to rotate relative to the static tower 11 for adjusting an orientation of the rotor 2 to a current wind direction. For example, an azimuth rotation of the nacelle 6 can encompass as much as two and a half full turns (2.5 times 360 degrees) of the nacelle 6 relative to the tower 11.

The wind turbine 1 further comprises a main cable 13 for transporting electrical energy produced in the nacelle 6, in particular by the generator unit 5, to a bottom portion 14 of the tower 11. The main cable 13 is, in particular, a high-voltage cable.

An upper end 15 of the main cable 13 is, for example, electrically connected to the generator unit 5 or the transformer unit 7 arranged in the nacelle 6. In the shown example of FIG. 2, the upper end 15 of the main cable 13 is connected to the transformer unit 7. In other examples, the main cable 13 may also be directly connected to the generator unit 5.

A lower end 16 of the main cable 13 is, for example, electrically connected to a switch gear 17 in the bottom portion 14 (e.g., on a switch gear platform 18) of the tower 11.

The wind turbine 1 further comprises at least one auxiliary cable 19. The at least one auxiliary cable 19 includes, for example, one or more electrical cables, one or more fiber optics cable and/or one or more earth cables. The at least one auxiliary cable 19 includes, for example, at least one low voltage cable for transferring an electrical current in the voltage range below 1 kV.

The at least one auxiliary cable 19 is, for example, configured for serving one or more electrical and/or electronical devices (not shown) in the nacelle 6.

Although only one auxiliary cable 19 is displayed in the figures and the following description refers to a single auxiliary cable 19, it is to be understood that the wind turbine 1 may comprise several auxiliary cables 19.

An upper end 20 of the auxiliary cable 19 is, for example, electrically connected to an interface unit 21 arranged in the nacelle 6. The upper end 20 of the auxiliary cable 19 may also be electrically connected to one or more electrical/electro-nical devices (not shown) arranged in the nacelle 6.

A lower end 22 of the auxiliary cable 19 is, for example, electrically connected in an intermediate portion 23 between the top and bottom portions 9, 14 or the bottom portion 14 of the tower 11. The lower end 22 of the auxiliary cable 19 is, for example, electrically connected to another interface unit 24 arranged in the bottom portion 14 (e.g., on the switch gear platform 18 or on another platform) of the tower 11.

As both the upper end 15 of the main cable 13 and the upper and 20 of the auxiliary cable 19 are attached in the nacelle 6, rotation (yawing) of the nacelle 6 relative to the tower 11 causes a movement of the main cable 13 and the auxiliary cable 19. Such a movement includes twisting as well as a vertical movement of the respective cable 13, 19.

In order to compensate the movement of the respective cable 13, 19 due to rotation of the nacelle 6 relative to the tower 11, the cables 13, 19 each comprise a loop 25, 26. In particular, the main cable 13 comprises a first loop 25 and the auxiliary cable 19 comprises a second loop 26, as shown in FIG. 2. Advantageously, the first loop 25 and the second loop 26 are decoupled from each other such that they are capable to compensate the movement of the respective cable 13, 19 independently from each other.

Figure 3:
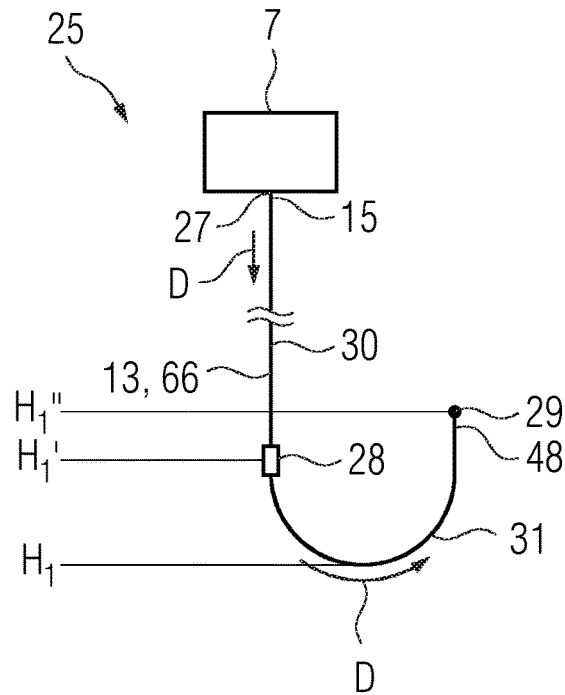
FIG. 3 shows a first loop of the main cable of FIG. 2.

FIG. 3 shows an enlarged view of the first loop 25. The first loop 25 is formed by a portion 66 of the main cable 13. The first loop 25 comprises an upper attachment point 27 in the nacelle 6, an intermediate attachment point 28 in the tower 11 for stopping a twisting movement of the main cable 13 and a lower attachment point 29 in the tower 11 for stopping a twisting and vertical movement of the main cable 13. The upper, intermediate and lower attachment points 27, 28, 29 are upper, intermediate and lower attachment points with respect to a direction D along the main cable 13 from the nacelle 6 to the bottom portion 14 of the tower 11.

Further, the first loop 25 comprises a free-hanging portion 30 between its upper and intermediate attachment points 27 and 28. Moreover, the first loop 25 comprises a U-shaped portion 31 between its intermediate and lower attachment points 28 and 29. Although not shown in the figures, the first loop 25 may also comprise—instead of the U-shaped portion 31—an S-shaped portion or a helically shaped portion between its intermediate and lower attachment points 28, 29.

Figure 4:
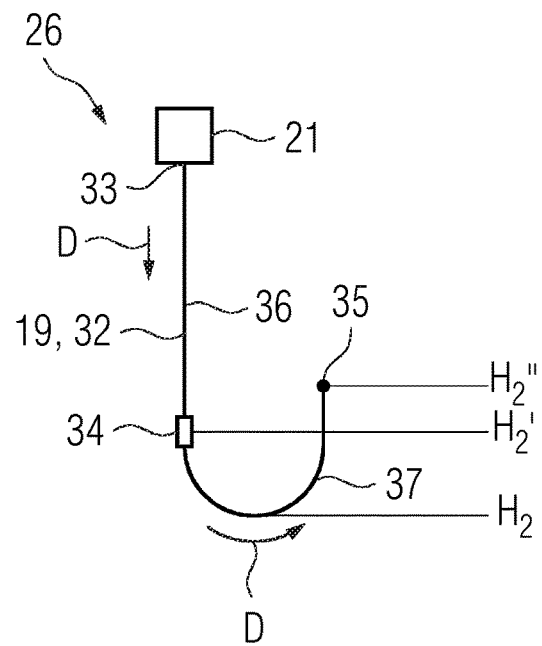
FIG. 4 shows a second loop of the auxiliary cable of FIG. 2.

FIG. 4 shows an enlarged view of the second loop 26. The second loop 26 is formed by a portion 32 of the auxiliary cable 19. The second loop 26 comprises an upper attachment point 33 at the nacelle 6, an intermediate attachment point 34 in the tower 11 for stopping a twisting movement of the auxiliary cable 19 and a lower attachment point 35 in the tower 11 for stopping a twisting and vertical movement of the auxiliary cable 19. The upper, intermediate and lower attachment points 33, 34, 35 are upper, intermediate and lower attachment points with respect to a direction D along the auxiliary cable 19 from the nacelle 6 to the intermediate or bottom portion 23, 14 of the tower 11.

Further, the second loop 26 comprises a free-hanging portion 36 between its upper and intermediate attachment points 33 and 34. Moreover, the second loop 26 comprises a U-shaped portion 37 between its intermediate and lower attachment points 34 and 35. Although not shown in the figures, the second loop 26 may also comprise—instead of the U-shaped portion 37—an S-shaped portion or a helically shaped portion between its intermediate and lower attachment points 34, 35.

The first loop 25 and the second loop 26 are decoupled from each other such that they are capable to compensate the movement of the respective cable 13, 19 caused by the rotation of the nacelle 6 relative to the tower 11 independently from each other.

In particular, the first loop 25 is arranged at a lower height $H_1$, $H_1'$, $H_1''$ (FIGS. 2, 3) compared to a height $H_2$, $H_2'$, $H_2''$ (FIGS. 2, 4) of the second loop 26. The heights $H_1$, $H_1'$, $H_1''$ and $H_2$, $H_2'$, $H_2''$ are, in particular, heights with respect to a tower height H of the erected tower 11.

For example, the U-shaped portion 31 of the first loop 25 is arranged at a lower height $H_1$ compared to the height $H_2$ of the U-shaped portion 37 of the second loop 26.

For example, the intermediate attachment point 28 (e.g., at a first slider unit) of the first loop 25 is arranged at a lower height $H_1'$ compared to the height $H_2'$ of the intermediate attachment point 34 (e.g., at a second slider unit) of the second loop 26.

For example, the lower attachment point 29 (e.g., at a cable tray of a carrying structure) of the first loop 25 is arranged at a lower height $H_1''$ compared to the height $H_2''$ of the lower attachment point 35 of the second loop 26.

Figure 5:
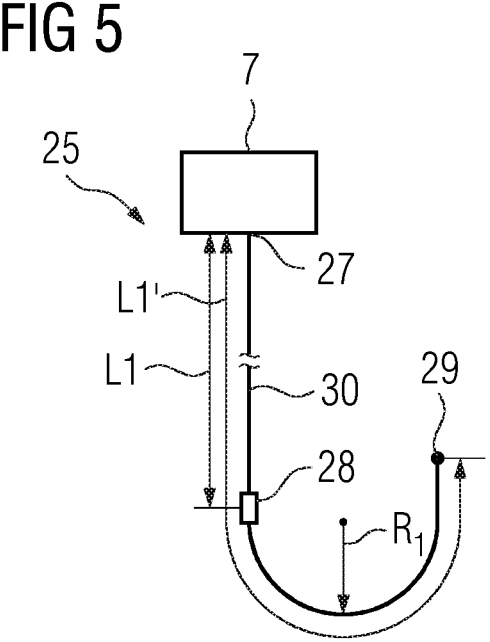
FIG. 5 shows a view similar as FIG. 3 in which a length of a cable portion forming the first loop is illustrated.
Figure 6:
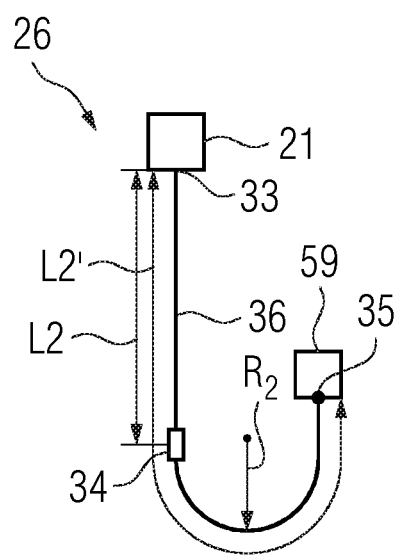
FIG. 6 shows a view similar as FIG. 4 in which a length of a cable portion forming the second loop is illustrated.

Moreover, as illustrated in FIGS. 5 and 6, a cable length $L_1$ of the free-hanging portion 30 of the first loop 25 is, for example, larger than a cable length $L_2$ of the free-hanging portion 36 of the second loop 26 accounting for the different twisting capacities (i.e. allowable twisting per meter) of the main and auxiliary cables 13, 19. Further, a total cable length $L_1'$ of the first loop 25 is, for example, larger than a total cable length $L_2'$ of the free-hanging portion 36 of the second loop 26.

Further, a bending radius $R_1$ of the first loop 25 is, for example, larger than a bending radius $R_2$ of the second loop 26 accounting for the different bending capacities of the main and auxiliary cables 13, 19.

Figure 8:
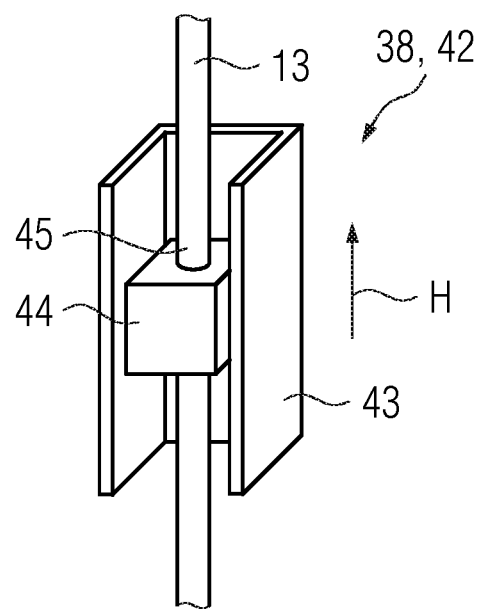
FIG. 8 shows a first slider unit of the attachment arrangement of FIG. 7.
Figure 9:
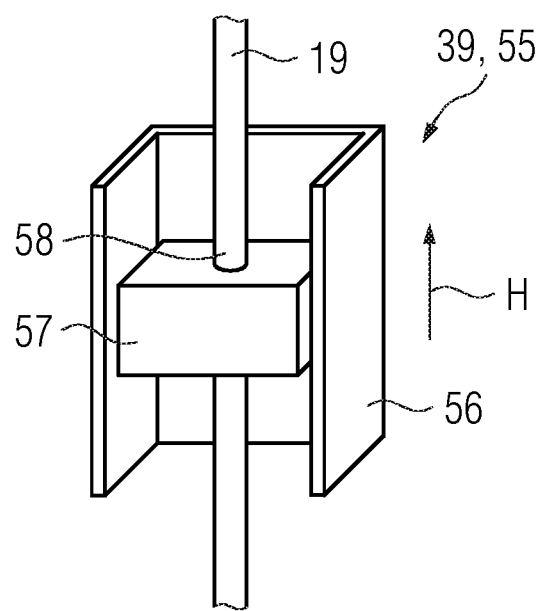
FIG. 9 shows a second slider unit of a second attachment arrangement for attaching the auxiliary cable to form the second loop shown in FIG. 4.

In order to achieve the decoupling and independent movement of the first loop 25 of the main cable 13 and the second loop 26 of the auxiliary cable 19, the wind turbine 1 comprises two separate attachment arrangements 38, 39. In particular, the wind turbine 1 comprises a first attachment arrangement 38 (FIGS. 7, 8) for forming the first loop 25. Further, the wind turbine 1 comprises a second attachment arrangement 39 (FIG. 9) for forming the second loop 26.

The attachment arrangements 38, 39 are arranged inside the tower 11. The attachment arrangements 38, 39 are, for example, each arranged at a separate tower platform 40, 41 (FIG. 2). The two platforms 40, 41 are, in particular, arranged at different heights $H_1'$, $H_2'$ inside the tower 11. In the shown example of FIG. 2, the first attachment arrangement 38 is arranged at a platform 40 which is, for example, a tower section platform. Further, the second attachment arrangement 39 is exemplarily arranged at a platform 41 which is, for example, a lift platform of the tower 11. In other examples, the first and second attachment arrangements 38, 39 may also be positioned on other platforms (not shown) of the tower 11.

Figure 7:
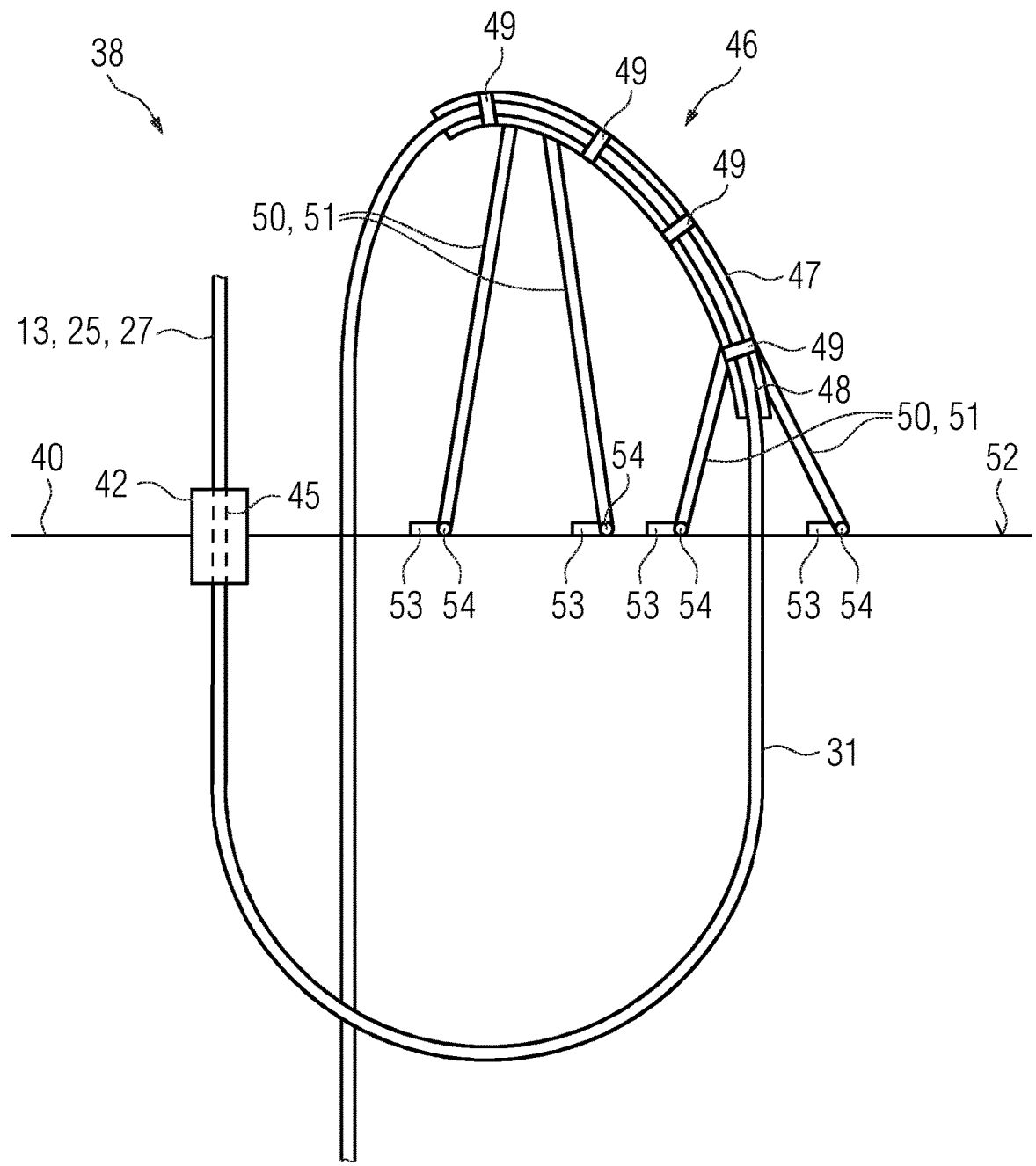
FIG. 7 shows a first attachment arrangement for attaching the main cable to form the first loop shown in FIG. 3.

As shown in FIG. 7, the first attachment arrangement 38 comprises a first slider unit 42 for providing the intermediate attachment point 28 (FIG. 3) of the first loop 25. The first slider unit 42 is configured for stopping a twisting movement of the main cable 13. The first slider unit 42 comprises a slider housing 43 (FIG. 8) attached inside the tower 11, for example to the platform 40. The first slider unit 42 further comprises a slider element 44 for sliding in the slider housing 43. An intermediate portion 45 of the first loop 25 is attached to the slider element 44 of the first slider unit 42. Since the first loop 25 is fixedly attached at its intermediate portion 45 to the slider element 44, a twisting movement of the main cable 13 caused by yawing of the nacelle 6 is stopped at the slider unit 42. In addition, since the slider element 44 is sliding inside the housing 43 in the height direction H of the tower 11, a vertical movement of the cable portion 66 (FIG. 3) of the main cable 13 forming the first loop 25 is still possible.

Instead of a slider unit 42, the first attachment arrangement 38 may also include another kind of attachment element configured for stopping a twisting movement but allowing a movement in a vertical direction of the main cable 13.

As shown in FIG. 7, the first attachment arrangement 38 further comprises a carrying structure 46 with a cable tray 47 for attaching and carrying the main cable 13. The carrying structure 46 is, in particular, configured for attaching and fixing a lower end 48 of the first loop 25. The lower end 48 of the first loop 25 is, for example, fixed to the cable tray 47 by means of one or more clamps 49. The cable tray 47 provides, in particular, the lower attachment point 29 (FIG. 3) of the first loop 25. Since the lower end 48 of the cable portion 66 (FIG. 3) forming the first loop 25 of the main cable 13 is fixedly attached to the cable tray 47, any movement of the main cable 13 caused by yawing of the nacelle 6 is stopped at the cable tray 47.

The carrying structure 46 may be arranged pivotably on the platform 40 such that it can be folded towards the platform 40 for transportation and folded up during assembly of the tower 11 and before starting operation of the wind turbine 1. The carrying structure 46 comprises, for example, a framework 50 including several beams 51 for supporting the cable tray 47. The beams 51 are, in particular, extending from a floor plate 52 of the platform 42 to the cable tray 47. The framework 50 includes, for example, several plates 53 fixed to the floor plate 52 of the platform 40. Each of the plates 53 is, for example, connected to a respective beam 51 by means of a hinge element 54. In this manner, the carrying structure 46 can be pivoted towards the platform 40 for transportation of the platform 40.

Similar as the first attachment arrangement 38, also the second attachment arrangement 39 comprises a second slider unit 55 for providing the intermediate attachment point 34 (FIG. 4) of the second loop 26. The second slider unit 55 is configured for stopping a twisting movement of the auxiliary cable 19. The second slider unit 55 comprises a slider housing 56 (FIG. 9) attached inside the tower 11, for example to the platform 41. The second slider unit 55 further comprises a slider element 57 for sliding in the slider housing 56. An intermediate portion 58 of the second loop 26 is attached to the slider element 57 of the second slider unit 55. Since the second loop 26 is fixedly attached at its intermediate portion 58 to the slider element 57, a twisting movement of the auxiliary cable caused by yawing of the nacelle 6 is stopped at the slider unit 55. In addition, since the slider element 57 is capable of sliding inside the slider housing 56 in the height direction H of the tower 11, a vertical movement of the cable portion 32 of the auxiliary cable 19 forming the second loop 26 is still possible.

Instead of a slider unit 55, the second attachment arrangement 39 may also include another kind of attachment element configured for stopping a twisting movement but allowing a movement in a vertical direction of the auxiliary cable 19.

The second attachment arrangement 39 comprises in addition a fixing element 59 (FIG. 6) for providing the lower attachment point 35 of the second loop 26 and for stopping any movement of the cable portion 32 forming the second loop 26.

Figure 10:
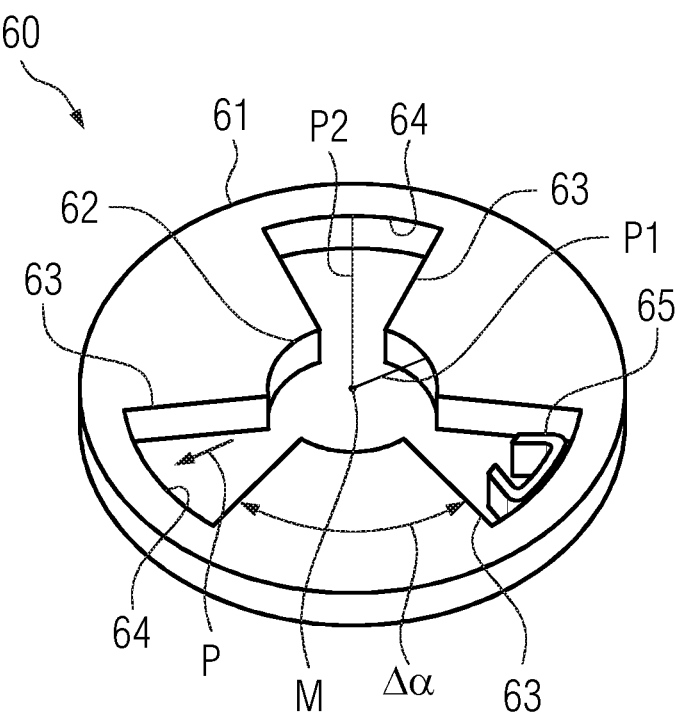
FIG. 10 shows a separator disk for separating the main cable and the auxiliary cable.

As shown in FIGS. 2 and 10, the wind turbine 1 and/or the tower 11 may further comprise one or more separator disks 60. The separator disks 60 are configured for separating the main cable 13 and the auxiliary cable 19 from each other with respect to a distance perpendicular to the height direction H. The separator disks 60 are, in particular, applied in a region of the free-hanging portions 30, 36 of the first and second loops 25, 26 in which the main cable 13 and the auxiliary cable 19 run in parallel.

As shown in FIG. 10, each of the one or more separator disks 60 has a ring-shaped structure 61 comprising a middle hole 62 and at least one further opening 63. In the shown example of FIG. 10, the separator disk 60 has three further openings 63. In other examples, a separate disk 60 may also have more or less than three further openings 63. In case of more than one further opening 63, the further openings 63 may be evenly spaced with respect to angular distances Aa across the ring-shaped structure 61.

The middle hole 62 has a first radius $P_1$ and is configured for inserting the main cable 13. The main cable 13 can move freely inside the middle hole 62. The main cable 13 is, in particular, not attached inside the middle hole 62.

Further, the at least one further opening 63 extends from the middle hole 62 radially outwards to a second radius $P_2$. The at least one further opening 63 is configured for inserting and fixing the at least one auxiliary cable 19.

In particular, each of the at least one further opening 63 includes an interior wall 64 arranged at the second radius $P_2$ and perpendicular to a radial direction P of the ring-shaped structure 61. In FIG. 10 two of three interior walls 64 have been denoted with a reference sign. The at least one auxiliary cable 19 is attached to the interior wall 64 of the at least one further opening 63 such that the at least one separator disk 60 follows a motion of the at least one auxiliary cable 19. For example, in each of the at least one further opening 63, one or more of the at least one auxiliary cable 19 can be attached. The separator disk 60 comprises, for example, a clamp 65 in each further opening 63 for attaching one or more auxiliary cables 19. In FIG. 10, exemplarily one clamp 65 is shown. Moreover, each of the further openings 63 may be tapered in the radial direction P from the second radius $P_2$ to the first radius $P_1$.

By separating the main cable 13 and the at least one auxiliary cable 19 from each other by means of the one or more separator disks 60, an interference of the main cable 13 and the at least one auxiliary cable 19 in a region above the second loop 26 is avoided.

Figure 11:
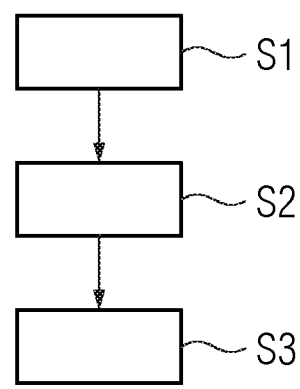
FIG. 11 shows a flowchart illustrating a method for manufacturing the wind turbine of FIG. 1 according to an embodiment.

In the following, a method for manufacturing a wind turbine 1 according to an embodiment is described with respect to FIG. 11. The wind turbine 1 comprising a tower 11, a nacelle 6 supported rotatably at a top portion 9 of the tower 11, a main cable 13 for transporting electrical energy produced in the nacelle 6 to a bottom portion 14 of the tower 11, and at least one auxiliary cable 19 guided from the nacelle 6 to an intermediate portion 23 between the top and bottom portions 9, 14 or the bottom portion 14 of the tower 11. Further, the main cable 13 comprises a first loop 25 and the at least one auxiliary cable 19 comprises a second loop 26.

In a first step S1 of the method, the at least one auxiliary cable 19 with the second loop 26 is installed in the tower 11.

The wind turbine 1 may comprise at least two platforms 40, 41 arranged at different heights H1', H2' inside the tower 11. In this case, step S2 may include attaching the lower end 58 of the cable portion 32 configured to form the second loop 26 to a second attachment arrangement 39 arranged at a higher one 41 of the at least two platforms 40, 41.

In a second step S2 of the method, the tower 11 is erected.

In a third step S3 of the method, the main cable 13 with the first loop 25 is installed in the tower 11. The first and second loops 25, 26 are configured to compensate, independently from each other, a movement of the respective cable 13, 19 due to rotation of the nacelle 6 relative to the tower 11 during operation of the wind turbine 1.

In the case that the wind turbine 1 comprises at least two platforms 40, 41 arranged at different heights $H_1'$, $H_2'$ inside the tower 11, step S3 may include attaching the intermediate portion 45 and/or the lower end 48 of the cable portion 66 configured to form the first loop 25 to a first attachment arrangement 38 arranged at a lower one 40 of the at least two platforms 40, 41.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMERALS 1 wind turbine
2 rotor
3 blade
4 hub
5 generator unit
6 nacelle
7 transformer unit
8 yaw bearing
9 top portion
10 upper end
11 tower
12 foundation
13 main cable
14 bottom portion
15 upper end
16 lower end
17 switch gear
18 platform
19 auxiliary cable
20 upper end
21 interface unit
22 lower end
23 intermediate portion
24 interface unit
25 first loop
26 second loop
27 upper attachment point
28 intermediate attachment point
29 lower attachment point
30 free-hanging portion
31 U-shaped portion
32 cable portion
33 upper attachment point
34 intermediate attachment point
35 lower attachment point
36 free-hanging portion
37 U-shaped portion
38 first attachment arrangement
39 second attachment arrangement
40 platform
41 platform
42 first slider unit
43 slider housing
44 slider element
45 intermediate portion
46 carrying structure
47 cable tray
48 lower end
49 clamp
50 framework
51 beam
52 floor plate
53 plate
54 hinge element
55 second slider unit
56 slider housing
57 slider element
58 intermediate portion
59 fixing element
60 separator disk 61 ring-shaped structure
62 middle hole
63 opening
64 wall
65 clamp
66 cable portion
Δα angular distance
D direction
H direction
$H_1$ height
$H_1'$ height
$H_1''$ height
$H_2$ height
$H_2'$ height
$H_2''$ height
$R_1$ radius
$R_2$ radius
P direction
$P_1$ radius
$P_2$ radius
S1-S3 method steps

The invention claimed is:

1. A wind turbine, comprising:
a tower;
a nacelle supported rotatably at a top portion of the tower;
a main cable for transporting electrical energy produced in the nacelle to a bottom portion of the tower; and
at least one auxiliary cable guided from the nacelle to an intermediate portion between the top portion and the bottom portion and/or to the bottom portion of the tower;
wherein the main cable comprises a first loop, and the at least one auxiliary cable comprises a second loop, and the first loop and the second loop are configured for compensating, independently from each other, a movement of the respective cable due to a rotation of the nacelle relative to the tower;
wherein each of the first loop and the second loop comprises, in a direction along the respective cable, an upper attachment point at the nacelle, an intermediate attachment point in the tower for stopping a twisting movement of the respective cable, and a lower attachment point in the tower for stopping a twisting and vertical movement of the respective cable;
wherein a height of the intermediate attachment point of the main cable within the tower is different than a height of the intermediate attachment point of the at least one auxiliary cable within the tower.

2. The wind turbine according to claim 1, wherein each of the first loop and the second loop comprises a free-hanging portion between the upper attachment point and the intermediate attachment point, and/or a U-shaped portion between the intermediate attachment point and the lower attachment point.

3. The wind turbine according to claim 1, wherein each of the first loop and the second loop comprises a U-shaped portion, and the U-shaped portion of the first loop is arranged, with respect to a tower height, at a lower height than the U-shaped portion of the second loop.

4. The wind turbine according to claim 1, wherein each of the first loop and the second loop comprises a free-hanging portion, and a cable length of the free-hanging portion of the first loop is larger than a cable length of the free-hanging portion of the second loop.

5. The wind turbine according to claim 1, wherein each of the first loop and the second loop comprises an attachment point at the nacelle and one or more further attachment points in the tower, and
the one or more further attachment points of the first loop is/are arranged, with respect to a tower height, at a lower height than the one or more further attachment points of the second loop.

6. The wind turbine according to claim 1, comprising
a first attachment arrangement for forming the first loop in the tower, and/or for attaching the first loop at the intermediate attachment point and a lower attachment point, and
a second attachment arrangement for forming the second loop in the tower, and/or for attaching the second loop at the intermediate attachment point and a lower attachment point,
wherein the first attachment arrangement is arranged, with respect to a tower height, at a lower height than the second attachment arrangement.

7. The wind turbine according to claim 6, comprising at least two platforms arranged, with respect to a tower height in an erected state of the tower, at different heights inside the tower, wherein:
a U-shaped portion of the first loop is arranged at a lower one of the at least two platforms and a U-shaped portion of the second loop is arranged at a higher one of the at least two platforms, and/or
the first attachment arrangement is arranged at a lower one of the at least two platforms and the second attachment arrangement is arranged at a higher one of the at least two platforms.

8. The wind turbine according to claim 6, wherein:
the first attachment arrangement and the second attachment arrangement comprise a first slider unit and a second slider unit, respectively, for attaching the respective loop at the intermediate attachment point and/or for stopping a twisting movement of the respective cable,
each of the first slider unit and the second slider unit comprises a slider housing attached inside the tower and a slider element for sliding in the respective slider housing,
the main cable is attached to the slider element of the first slider unit for providing the intermediate attachment point of the first loop, and
the at least one auxiliary cable is attached to the slider element of the second slider unit for providing the intermediate attachment point of the second loop.

9. The wind turbine according to claim 6, wherein the first attachment arrangement comprises a carrying structure with a cable tray for attaching and carrying the main cable and/or for providing the lower attachment point of the first loop.

10. The wind turbine according to claim 9, wherein the carrying structure is arranged pivotably on a platform of the tower such that the carrying structure is configured to be folded towards the platform for transportation and folded up for operation of the wind turbine.

11. The wind turbine according to claim 1, wherein:
the tower comprises one or more separator disks for separating the main cable and the at least one auxiliary cable from each other in a region of a free-hanging portion of the first loop and the second loop in which the main cable and the at least one auxiliary cable run in parallel,
the one or more separator disks each have a ring-shaped structure comprising a middle hole with a first radius for inserting the main cable and at least one further opening extending from the middle hole radially outwards to a second radius with an interior wall arranged at the second radius, and the at least one auxiliary cable is attached to the interior wall of the at least one further opening such that the at least one separator disk follows a motion of the at least one auxiliary cable.

12. The wind turbine according to claim 11, wherein each of the one or more separator disks comprises two or more of the further openings evenly spaced with respect to angular distances across the ring-shaped structure, and/or the at least one further opening is tapered in a radial direction from the second radius to the first radius.

13. The wind turbine according to claim 1, comprising, arranged in the nacelle, a generator unit for converting rotational energy into electrical energy and a transformer unit for transforming the electrical energy from a low voltage state to a high voltage, wherein the main cable is electrically connected at an upper end thereof to the transformer unit for transporting the electrical energy in the high voltage state towards the bottom portion of the tower.

14. A method for manufacturing a wind turbine comprising a tower, a nacelle supported rotatably at a top portion of the tower, a main cable for transporting electrical energy produced in the nacelle to a bottom portion of the tower, and at least one auxiliary cable guided from the nacelle to an intermediate portion between the top portion and the bottom portion and/or the bottom portion of the tower, wherein the main cable comprises a first loop and the at least one auxiliary cable comprises a second loop, the method comprising:

installing the at least one auxiliary cable with the second loop in the tower;

erecting the tower; and installing the main cable with the first loop in the tower, wherein the first loop and the second loop are configured to compensate, independently from each other, a movement of the respective cable due to a rotation of the nacelle relative to the tower during operation of the wind turbine;

wherein each of the first loop and the second loop comprises, in a direction along the respective cable, an upper attachment point at the nacelle, an intermediate attachment point in the tower for stopping a twisting movement of the respective cable, and a lower attachment point in the tower for stopping a twisting and vertical movement of the respective cable;

wherein a height of the intermediate attachment point of the main cable within the tower is different than a height of the intermediate attachment point of the at least one auxiliary cable within the tower.

15. The method according to claim 14, wherein:

the wind turbine comprises at least two platforms arranged at different heights inside the tower, installing the main cable with the first loop in the tower includes forming the first loop by means of a first attachment arrangement arranged on a lower one of the at least two platforms, and installing the at least one auxiliary cable with the second loop in the tower includes forming the second loop by means of a second attachment arrangement arranged at a higher one of the at least two platforms.

* * * * *